United States Patent
Hoang

(10) Patent No.: US 8,123,191 B2
(45) Date of Patent: Feb. 28, 2012

(54) MECHANICAL OVERRIDE

(75) Inventor: Loc G. Hoang, Houston, TX (US)

(73) Assignee: Cameron International Corporation, Houston, TX (US)

(*) Notice: Subject to any disclaimer, the term of this patent is extended or adjusted under 35 U.S.C. 154(b) by 1043 days.

(21) Appl. No.: 10/908,165

(22) Filed: Apr. 29, 2005

(65) Prior Publication Data

US 2006/0243936 A1    Nov. 2, 2006

(51) Int. Cl.
*F16K 31/02* (2006.01)
(52) U.S. Cl. .................. 251/129.03; 251/63; 251/326
(58) Field of Classification Search .......... 251/326, 251/248, 129.03, 61.4, 62, 63, 289, 291, 251/296
See application file for complete search history.

(56) References Cited

U.S. PATENT DOCUMENTS

| | | | |
|---|---|---|---|
| 4,295,390 A | 10/1981 | Buchta | |
| 4,460,154 A * | 7/1984 | Kunkle | 251/129.03 |
| 5,497,672 A | 3/1996 | Appleford et al. | |
| 6,089,531 A * | 7/2000 | Young | 251/61.4 |
| 6,595,487 B2 | 7/2003 | Johansen et al. | |
| 6,609,533 B2 * | 8/2003 | Sundararajan | 137/15.19 |
| 6,719,057 B2 | 4/2004 | Johansen | |
| 6,981,428 B2 * | 1/2006 | Donald et al. | 74/89.26 |
| 2002/0011580 A1 | 1/2002 | Johansen et al. | |
| 2002/0084075 A1 | 7/2002 | Johansen | |
| 2002/0139948 A1 * | 10/2002 | Hademenos et al. | 251/63.6 |
| 2003/0145667 A1 | 8/2003 | Donald et al. | |

* cited by examiner

*Primary Examiner* — John Fristoe, Jr.
*Assistant Examiner* — Andrew J Rost
(74) *Attorney, Agent, or Firm* — Chamberlin, Hrdickla, White, Williams & Aughtry

(57) ABSTRACT

A valve system comprising a closure member that is linearly translatable within a valve body. A fail safe assembly is connected to the valve body and a first rod member that is connected to the closure member. A linear actuator is movably connected to the fail safe assembly and is operable to move the first rod member. A mechanical override system is connected to the linear actuator and is operable to move the linear actuator relative to the valve body.

19 Claims, 3 Drawing Sheets

MECHANICAL OVERRIDE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to valve actuators. More specifically, the present invention relates to override and backup systems for subsea valve actuators. Still more specifically, the present invention relates to override systems for subsea valve applications.

Increasing performance demands for subsea hydrocarbon production systems have led to a demand for high performance control systems to operate subsea pressure control equipment, such as valves and chokes. Hydraulic actuators are used to operate many of the pressure control equipment used subsea. Pressurized hydraulic fluid may be supplied to the hydraulic actuators by a direct hydraulic control system or an electrohydraulic control system. Direct hydraulic control systems provides pressurized hydraulic fluid directly from the surface to the subsea valve actuators. Electrohydraulic control systems utilize electrical signals transmitted to an electrically actuated valve manifold that controls the flow of hydraulic fluid to the hydraulic actuators of the pressure control equipment.

The performance of both direct hydraulic and electrohydraulic control systems is affected by a number of factors, including the water depth in which the components operate, the distance from the platform controlling the operation, and a variety of other constraints. Thus, as water depth and field size increases, the limits of hydraulic control systems become an increasing issue. Further, even when the use of a hydraulic control system is technically feasible, the cost of the system may preclude its use in a smaller or marginal field.

In order to provide an alternative to hydraulic control systems, full electrical control systems, including electric actuators, have been developed. Instead of relying on pressurized hydraulic fluid to actuate the pressure control components, electrical actuators are supplied with an electric current. The reliance on electric current can allow for improved response times, especially over long distances and in deep water.

Even with electrical control systems and actuators, many operators still desire some sort of system that allows for operation of the actuators in the case of failure of the electric actuator or interruption in the supply of electrical current. In certain applications, an operator may want to be able to override the electrical control system and operate a valve, or some other components, via remote operation or direct intervention, such as with a remotely operated vehicle (ROV).

Thus, there remains a need to develop methods and apparatus for allowing operation of subsea actuators that overcome some of the foregoing difficulties while providing more advantageous overall results.

SUMMARY OF THE PREFERRED EMBODIMENTS

The embodiments of the present invention are directed toward methods and apparatus for a valve system comprising a closure member that is linearly translatable within a valve body. A fail safe assembly is connected to the valve body and a first rod member that is connected to the closure member. A linear actuator is movably connected to the fail safe assembly and is operable to move the first rod member by moving the linear actuator relative to the valve body. A mechanical override system is connected to the linear actuator and is operable to move the linear actuator relative to the valve body.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
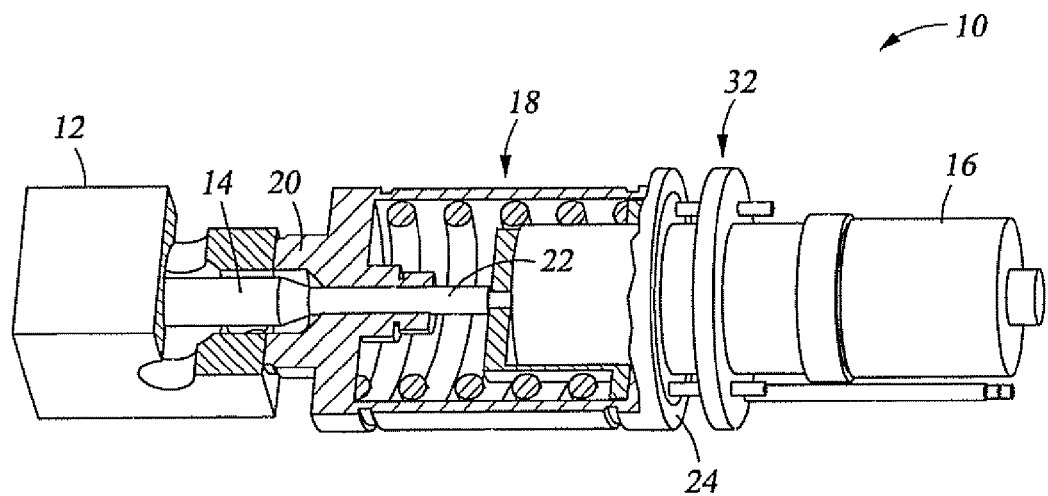
FIG. 1 is a partial sectional view of a valve actuator with an override system constructed in accordance with embodiments of the invention.
Figure 2:
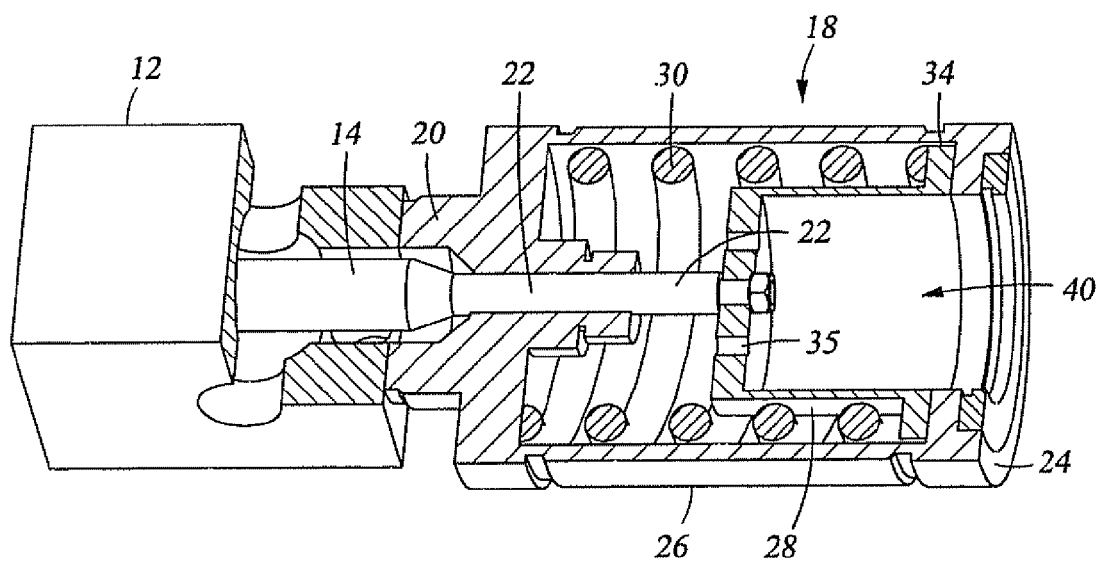
FIG. 2 is a partial sectional view of an override system constructed in accordance with embodiments of the invention.

Referring now to FIG. 1, valve system 10 comprises valve body 12, closure member 14, linear actuator 16, fail safe assembly 18, and mechanical override system 32. First end 20 of fail safe assembly 18 is connected to valve body 12. Rod 22 of fail safe assembly 18 is coupled to closure member 14. Linear actuator 16 is connected to second end 24 of fail safe assembly 18 by a mechanical override system 32. Referring now to FIG. 2, fail safe assembly 18 comprises cylindrical body 26, piston 28, and spring 30. Piston 28 forms receptacle 40 and closely engages the inner surface of body 26. Rod 22 is connected to one end of piston 28. Spring 30 is disposed between first end 20 and piston 28 so as to bias the piston toward second end 24.

Piston 28 operates in a pressure-balanced mode where the hydraulic fluid moves across the piston through annular gap 34 between the piston and body 26. In certain embodiments, piston 28 may also comprise additional fluid passageways 35 that allow fluid to flow through the piston. Annular gap 34 and fluid passageways 35 may be sized so as to restrict the flow of fluid across piston 28 and thus limit the speed at which the piston may travel.

Figure 3:
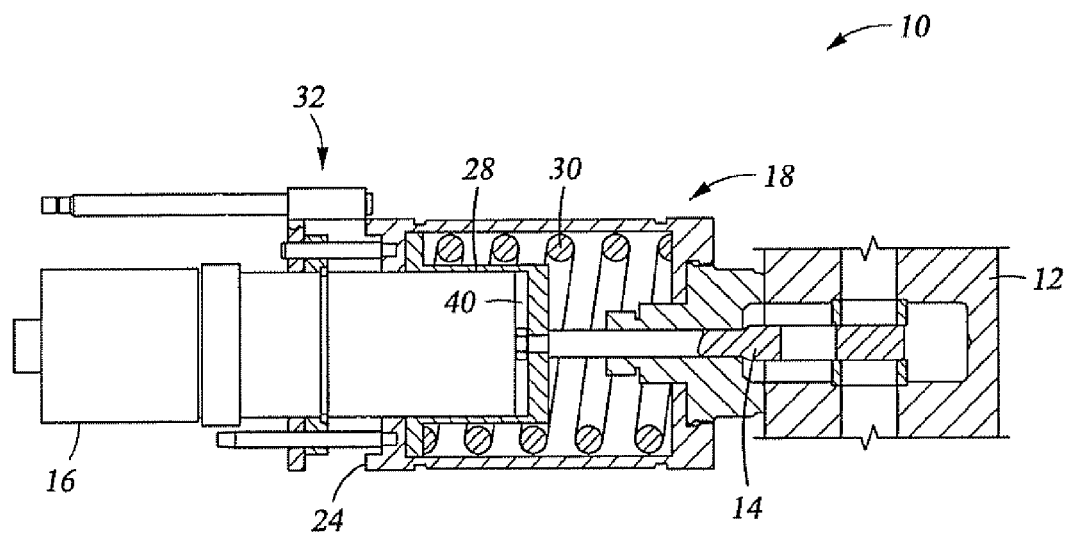
FIG. 3 is a partial sectional view of a valve actuator with an override system constructed in accordance with embodiments of the invention.

Referring now to FIG. 3, receptacle 40 receives a portion of linear actuator 16 that is connected to fail safe assembly 18 by mechanical override system 32. FIG. 3 shows valve assembly 10 in a retracted position where piston 28 is positioned toward second end 24 and spring 30 is expanded. To shift closure member 14, linear actuator 16 is activated and rod 46 extends from the actuator, as shown in FIG. 4.

Figure 4:
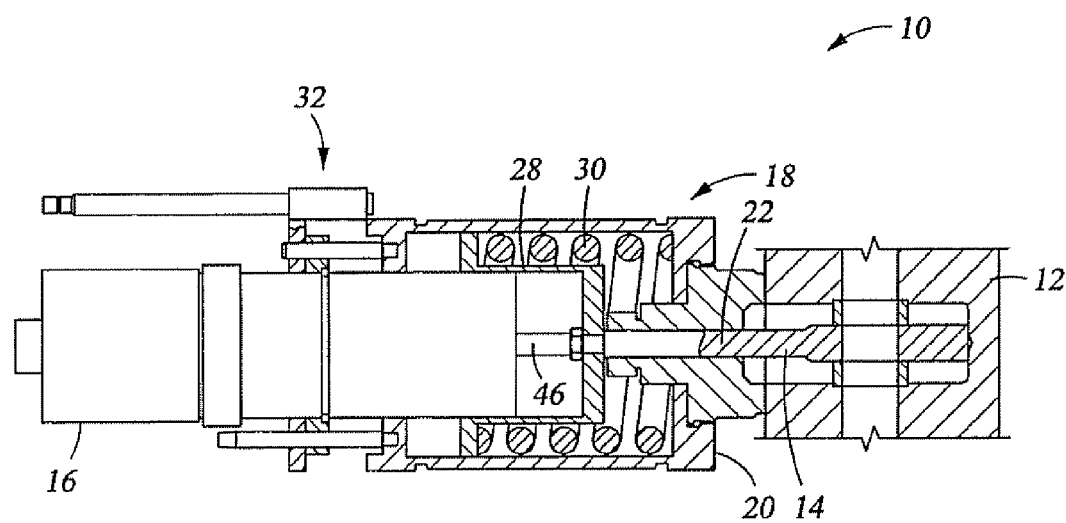
FIG. 4 is a partial sectional view of a valve actuator with an override system constructed in accordance with embodiments of the invention.

FIG. 4 shows valve assembly 10 in an extended position where piston 28 is positioned toward first end 20 and spring 30 is collapsed. Piston 28 is moved toward first end 20 by the operation of actuator 16. Actuator 16 extends rod 46 that bears against rod 22 that is connected to piston 28. The movement of piston 28 toward first end 20 compresses spring 30. As actuator 16 retracts rod 46, spring 30 pushes piston 28 toward second end 24 and the initial position as shown in FIG. 3.

Thus, piston 28 and spring 30 operates as a fail-safe device where spring 30 pushes piston 28 toward second end 24 unless rod 46 is extended from linear actuator 16. Rod 46 of actuator 16 may also be coupled to piston 28 such that the piston can be used to control the speed at which rod 46 retracts.

Mechanical override system 32 maintains the position of actuator 16 relative to valve body 12 so that the extension of rod 46 places closure member 14 in the proper position. Mechanical override system 32 also allows actuator 16 to be moved relative to valve body 12 so as to move closure member 14 when rod 46 can not be extended due to component malfunction or other failure. Mechanical override system 32 may comprise a gear system, screw drive, or other mechanically activated translation mechanism that can move actuator 16 with sufficient force to compress spring 30 and shift closure member 14 within valve body 12 Mechanical override system 32 may also comprise an ROV interface that allows the mechanical override system to be operated by an ROV.

Figure 5:
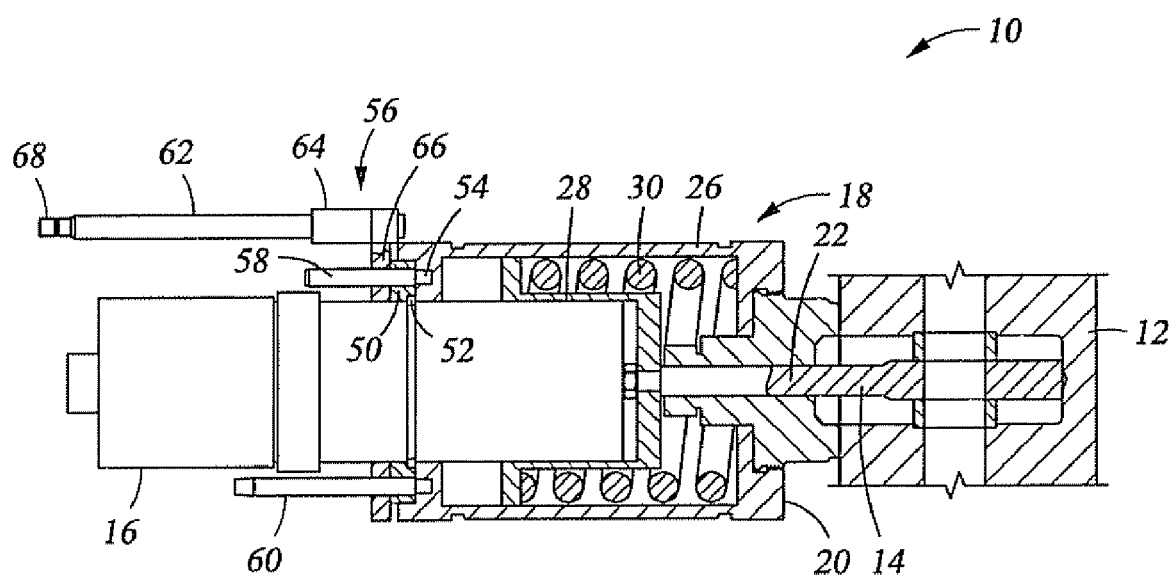
FIG. 5 is a partial sectional view of a valve actuator with an override system constructed in accordance with embodiments of the invention.

Referring now to FIG. 5, one embodiment of mechanical override system 32 comprises retainer 50, split ring 52, base 54, gear assembly 56, threaded rod 58, guide rod 60, and drive rod 62. Base 54 is fixably coupled to the end of body 26. Split ring 52 engages linear actuator 16 and is held in place by retainer 50 that is slidably mounted to threaded rod 58 and guide rod 60. Gear assembly comprises drive gear 64 that is mounted to drive rod 60 and traveling gear 66 that engages threaded rod 58. Drive rod 62 has an ROV interface 68 that allows an ROV to rotate the rod and operate the mechanical override system.

As drive rod 62 is rotated, drive gear 64 rotates traveling gear 66. The rotation of traveling gear 66 causes it to move along threaded rod 58, pushing retainer 50 toward base 54. As retainer 50 moves, linear actuator 16 is moved toward valve body 12, compressing spring 30 and moving closure member 14 within the valve body to the fully actuated position of FIG. 5. Gear assembly 56 may preferably be a self-locking system that will maintain the position of linear actuator 16 until drive rod 62 is rotated in the opposite direction.

Thus, valve system 10 can be actuated in a first mode (as shown in FIG. 4), where linear actuator 16 extends rod 46 so as to move piston 28 toward first end 20 of fail safe assembly 18. In the first mode, the position of linear actuator 16 relative to valve body 12 is maintained by override system 32. Valve system 10 can also be actuated in a second mode (as shown in FIG. 5), where linear actuator 16 is moved relative to valve body 12 by mechanical override system 32. The movement of linear actuator 16 moves piston 28 toward first end 20 of fail safe assembly 18.

Mechanical override system may utilize any of a number of mechanical systems to move the linear actuator and shift the position of the closure member. For example, a mechanical override system may use a geared or threaded system that transforms rotational motion into linear translation of the actuator. Other mechanical override systems may comprise external hydraulic rams or other type devices to push the linear actuator.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the mechanical override apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A valve system comprising:
    a closure member that is linearly translatable within a valve body;
    a fail safe assembly comprising:
        a hollow body having a first end that is connected to the valve body,
        a spring disposed within said hollow body between the first end and a piston disposed within the hollow body, wherein the spring biases the piston toward the second end of the hollow body, and
        a first rod member that is connected to said closure member and the piston;
    a linear actuator engaged with a second end of the hollow body of said fail safe assembly, wherein said linear actuator is operable to move the first rod member; and
    a mechanical override system connecting said linear actuator to said fail safe assembly, wherein said mechanical override system is operable to move the linear actuator relative to the valve body.

2. The valve system of claim 1 wherein said linear actuator comprises a second rod member that is operable to move the first rod member.

3. The valve system of claim 2 wherein said fail safe assembly is operable to translate said closure member independent of operation of said linear actuator.

4. The valve system of claim 2 wherein said valve system has a first mode, wherein the second rod member extends from said linear actuator so as to move said closure member within the valve body, and a second mode, wherein said linear actuator is moved relative so said valve body so as to move said closure member within the valve body.

5. The valve system of claim 1 wherein said mechanical override system comprises a gear system operable to translate said linear actuator relative to the valve body.

6. The valve system of claim 1 wherein said spring partially surrounds the piston and said linear actuator.

7. The valve system of claim 1 wherein said linear actuator is an electric actuator.

8. The valve system of claim 1 further comprising an ROV interface operable to actuate said mechanical override system.

9. A valve actuation system comprising:
    a hollow body having a first end coupled to a valve body;
    a linear actuator partially disposed within a second end of said hollow body; and
    a mechanical override system connected to said hollow body and said linear actuator and operable to move said linear actuator relative to the valve body.

10. The valve actuation system of claim 9 further comprising:
   a piston at least partially disposed within said hollow body; and
   a first rod member connected between said piston and a closure member disposed within the valve body.

11. The valve actuation system of claim 10 further comprising a spring disposed between said piston and said hollow member, wherein said spring biases said piston toward the second end of said hollow body.

12. The valve actuation system of claim 11 wherein said mechanical override system comprises a gear system operable to translate said linear actuator relative to said hollow body.

13. The valve actuation system of claim 10 wherein said linear actuator comprises a second rod member.

14. The valve actuation system of claim 13 wherein said linear actuator has a first mode wherein the second rod member extends from said linear actuator so as to move said piston toward the first end of said hollow body while said linear actuator does not move relative to said valve body.

15. The valve actuation system of claim 14 wherein said linear actuator has a second mode wherein said linear actuator moves relative to said valve body so as to move said piston toward the first end of said hollow body.

16. The valve actuation system of claim 9 further comprising an interface for coupling an ROV to said mechanical override system.

17. A valve system comprising:
   a closure member disposed within a valve body;
   a hollow body having a first end that is connected to the valve body;
   a spring disposed within said hollow body between the first end and a piston disposed within the hollow body, wherein the spring biases the piston toward the second end of the hollow body;
   a first rod member connected to said closure member and the piston;
   a linear actuator at least disposed within the second end of the hollow body and having a second rod member extendable to translate said closure member within the valve body; and
   means for moving said linear actuator relative to the valve body so as to translate said closure member without extending the second rod member from said linear actuator.

18. The valve system of claim 17 wherein said means for moving said linear actuator connects said linear actuator to the valve body.

19. The valve system of claim 17 wherein said means for moving said linear actuator comprises an ROV interface.

* * * * *